(12) United States Patent
Raj et al.

(10) Patent No.: US 8,548,288 B2
(45) Date of Patent: Oct. 1, 2013

(54) EFFICIENT INTER-CHIP OPTICAL COUPLING

(75) Inventors: Kannan Raj, San Diego, CA (US); John E. Cunningham, San Diego, CA (US); Hiren D. Thacker, San Diego, CA (US)

(73) Assignee: Oracle International Corporation, Redwood Shores, CA (US)

(*) Notice: Subject to any disclaimer, the term of this patent is extended or adjusted under 35 U.S.C. 154(b) by 107 days.

(21) Appl. No.: 13/331,782

(22) Filed: Dec. 20, 2011

(65) Prior Publication Data

US 2013/0156366 A1    Jun. 20, 2013

(51) Int. Cl.
*G02B 6/00* (2006.01)
*G02B 6/26* (2006.01)
*G02B 6/42* (2006.01)
*G02B 6/12* (2006.01)

(52) U.S. Cl.
USPC .................................. 385/14; 385/24; 385/88

(58) Field of Classification Search
USPC ............... 385/14–16, 24, 37, 147, 34, 39, 42, 385/49–50, 88
See application file for complete search history.

(56) References Cited

U.S. PATENT DOCUMENTS

| | | | | | |
|---|---|---|---|---|---|
| 4,240,849 | A | * | 12/1980 | Kurokawa et al. | 156/73.2 |
| 5,009,476 | A | * | 4/1991 | Reid et al. | 385/14 |
| 5,159,700 | A | * | 10/1992 | Reid et al. | 385/14 |
| 5,170,448 | A | * | 12/1992 | Ackley et al. | 385/31 |
| 5,263,111 | A | * | 11/1993 | Nurse et al. | 385/130 |
| 5,562,838 | A | * | 10/1996 | Wojnarowski et al. | 216/24 |
| 6,785,447 | B2 | * | 8/2004 | Yoshimura et al. | 385/42 |
| 8,121,446 | B2 | * | 2/2012 | Zheng et al. | 385/14 |
| 8,267,583 | B2 | * | 9/2012 | Yao et al. | 384/31 |
| 2002/0039464 | A1 | * | 4/2002 | Yoshimura et al. | 385/14 |
| 2012/0321251 | A1 | * | 12/2012 | Yao et al. | 385/42 |
| 2013/0121635 | A1 | * | 5/2013 | Thacker et al. | 385/15 |

* cited by examiner

*Primary Examiner* — Akm Enayet Ullah
(74) *Attorney, Agent, or Firm* — Park, Vaughan, Fleming & Dowler, LLP; Steven E. Stupp (57) ABSTRACT

In an MCM, an optical signal is conveyed by an optical waveguide disposed on a surface of a first substrate to a first optical coupler. This first optical coupler redirects the optical signal out of the plane of the optical waveguide. Then, an optical interposer guides the optical signal between the first optical coupler and a second optical coupler on a surface of a second substrate, thereby reducing spatial expansion of the optical signal between the optical couplers. Moreover, the second optical coupler redirects the optical signal into a plane of an optical waveguide disposed on a surface of the second substrate, which then conveys the optical signal.

20 Claims, 5 Drawing Sheets

EFFICIENT INTER-CHIP OPTICAL COUPLING

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure generally relates to the design of multi-chip modules (MCMs). More specifically, the present disclosure relates to an MCM that couples an optical signal between optical waveguides on different substrates using an optical interposer.

2. Related Art

Optical signaling based on silicon photonics has the potential to alleviate off-chip bandwidth bottlenecks, as well as to provide low latency chip-to-chip communication. Interconnects with these capabilities can facilitate new system architectures that include multiple chips, with multi-threaded cores. For maximal density, the physical package for such a system may employ a combination of planar packaging and vertical chip stacking as needed. An example of such a system is a multi-chip module (MCM) or 'macrochip' that includes a logically contiguous piece of photonically interconnected silicon that integrates processors, memory and a system-wide interconnect.

In the macrochip, optical couplers, such as optical proximity couplers (OPxCs), couple the distributed processors to optical routing layers, which support low-latency, wavelength-division multiplexed (WDM) optical links between chips using silicon-on-insulator (SOI) optical waveguides. These optical waveguides form an interconnect network that provides low-power, high-bandwidth, and high-density communication between the chips in the macrochip. Moreover, each of the chips in the macrochip can be interconnected to every other chip via the WDM optical links that run in orthogonal directions on two routing layers. The optical signals from the chips are coupled into, and between, the routing layers using face-to-face OPxCs.

However, achieving high-fidelity signaling across a multi-chip geometry, such as the macrochip, with low-loss coupling and broadband transmission is a major challenge. Many of the existing techniques used to implement inter-layer OPxCs (such as mirror-reflecting couplers, diffraction-grating couplers, butt-coupled optical waveguides and lens couplers) typically have insertion losses between 2.8 and 4.5 dB per OPxC hop. These loss numbers are very high and can be attributed to: alignment errors between the top and bottom OPxC surfaces, light clipping at each mirror surface, back scattering, grating-etch errors, mode mismatch, etc. In a system employing a few such OPxC hops per channel, these high losses can severely impact the optical-link budget, which can significantly increase the performance requirements (and, thus, the cost) of other components in the system, such as the optical sources and/or the receivers. As a consequence, it can be difficult to obtain high-fidelity signaling in such a multi-chip geometry with low-loss coupling and broadband transmission, which can adversely impact the performance of the macrochip.

Hence, what is needed is an MCM without the problems described above.

SUMMARY

One embodiment of the present disclosure provides a multi-chip module (MCM). This MCM includes a first substrate having a first surface and a second substrate having a second surface. The first substrate includes: a first optical waveguide disposed on the first surface; and a first optical coupler to couple an optical signal between a plane of the first optical waveguide and a direction out of the plane of the first optical waveguide. Moreover, the second substrate includes: a second optical waveguide disposed on the second surface; and a second optical coupler to couple the optical signal between a plane of the second optical waveguide and a direction out of the plane of the second optical waveguide. Furthermore, the MCM includes an optical interposer, positioned between the first surface and the second surface, to guide the optical signal between the first optical coupler and the second optical coupler, thereby reducing spatial expansion of the optical signal between the first optical coupler and the second optical coupler.

The optical interposer may include an optical channel surrounded by an interposer substrate to transport the optical signal. This optical channel may be aligned with the first optical coupler and the second optical coupler. Note that the optical channel may preserve an optical mode of the optical signal.

In some embodiments, the interposer substrate includes silicon and the optical channel includes a through-silicon optical via. For example, the through-silicon optical via may include epoxy.

Alternatively, in some embodiments the interposer substrate includes a glass and the optical channel includes a through-glass optical via. For example, the through-glass optical via may include a material having an index of refraction larger than the glass, such as titanium oxide, silicon nitride and/or titanium nitride.

In some embodiments, the optical interposer includes bundles of optical fibers and the optical channel includes at least one of the bundles.

Additionally, in some embodiments the optical channel transports the optical signal within the optical interposer using total internal reflection. For example, the optical channel may include silicon and the interposer substrate may include a dielectric, such as silicon dioxide.

Moreover, a given optical coupler, which can be the first optical coupler or the second optical coupler, may include a reflecting facet.

A variety of techniques may be used to facilitate assembly of the MCM and to maintain alignment of the components. For example, the first substrate may include first negative features recessed below the first surface, and the second substrate may include second negative features recessed below the second surface. The MCM may also include alignment features aligned with and mechanically coupled to pairs of the first negative features and the second negative features, thereby facilitating alignment and maintaining relative positions of the first optical coupler and the second optical coupler. Note that the first negative features and the second negative features may include etch pits. Additionally, the alignment features may include spherical balls.

Note that the MCM may be implemented using silicon-on-insulator (SOI) technology. As a consequence, a given substrate, which can be the first substrate or the second substrate, may include: a buried-oxide layer disposed on the given substrate; and a semiconductor layer disposed on the buried-oxide layer, where a given optical waveguide, which can be the first optical waveguide or the second optical waveguide, is defined in the semiconductor layer. Moreover, a given substrate may include a semiconductor.

Another embodiment provides a system that includes the MCM.

Another embodiment provides a method for directly optically coupling an optical signal from a first substrate to a second substrate. During this method, the optical signal is transported in a first optical waveguide disposed on a first surface of the first substrate. Then, the optical signal is optically coupled out of a plane of the first optical waveguide using a first optical coupler disposed on the first surface. Moreover, the optical signal is guided using an optical interposer which is positioned between the first substrate and the second substrate, thereby reducing spatial expansion of the optical signal. Furthermore, the optical signal is optically coupled into a plane of a second optical waveguide using a second optical coupler disposed on a second surface of the second substrate. Next, the optical signal is transported in the second optical waveguide disposed on the second surface.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a multi-chip module (MCM), a system that includes the MCM, and a method for directly optically coupling an optical signal between substrates or chips in the MCM are described. In this MCM, the optical signal is conveyed by an optical waveguide disposed on a surface of a first substrate to a first optical coupler. This first optical coupler redirects the optical signal out of the plane of the optical waveguide. Then, an optical interposer guides the optical signal between the first optical coupler and a second optical coupler on a surface of a second substrate, thereby reducing spatial expansion of the optical signal between the optical couplers. Moreover, the second optical coupler redirects the optical signal into a plane of an optical waveguide disposed on a surface of the second substrate, which then conveys the optical signal.

By facilitating direct optical coupling of the optical signal, the MCM may facilitate high-fidelity signaling between the substrates with low-loss coupling and broadband transmission. In particular, the optical interposer may reduce the divergence of the optical signal, which reduces optical losses. For example, the optical insertion loss may be less than 1.5 dB per optical-proximity-coupler (OP×C) hop per channel in the MCM. As a consequence, the MCM may have improved performance in applications such as high-performance computing (e.g., in a macrochip).

Figure 1:
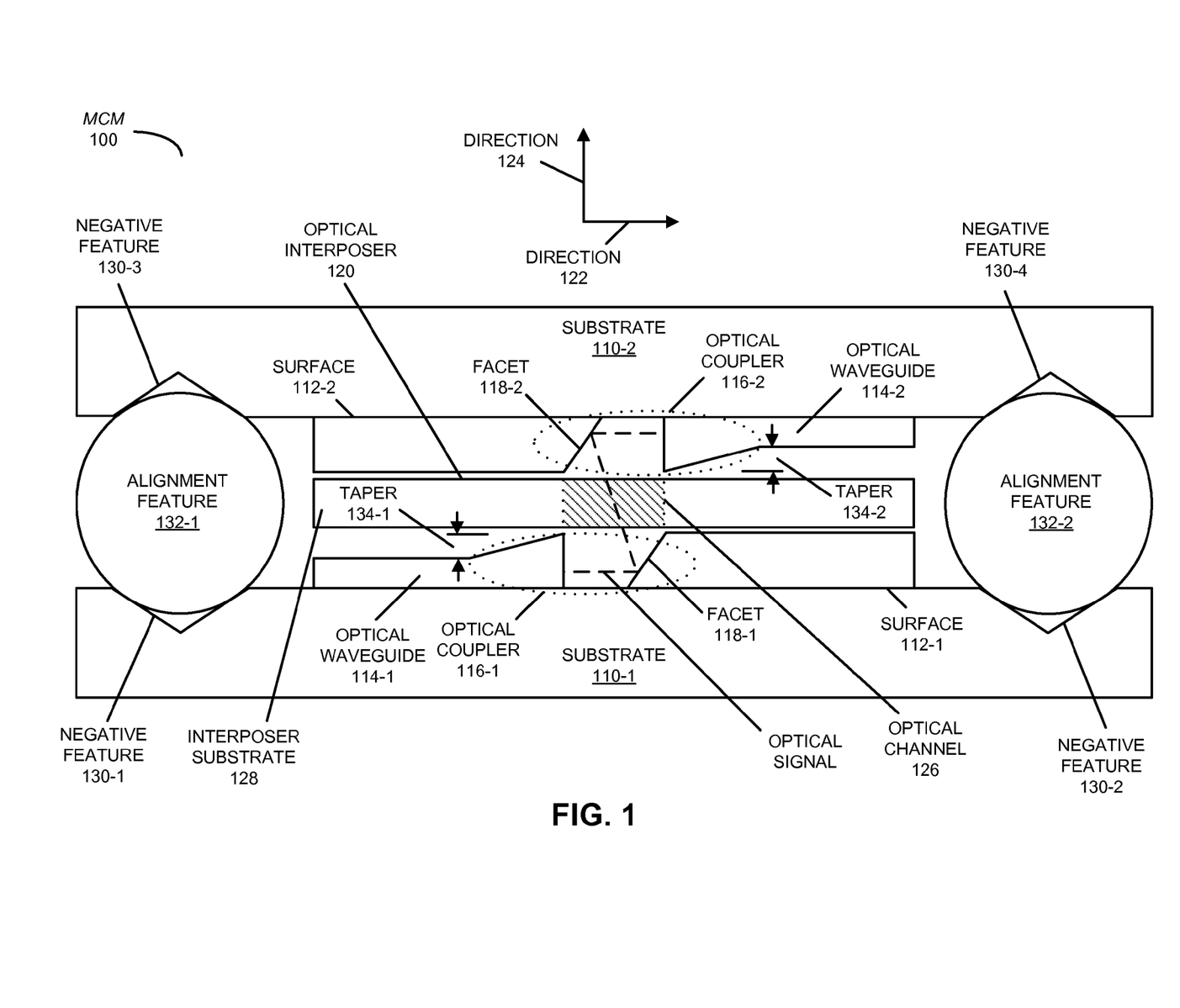
FIG. 1 is a block diagram illustrating a side view of a multi-chip module (MCM) with an optical interposer in accordance with an embodiment of the present disclosure.

We now describe embodiments of the MCM. FIG. 1 presents a block diagram illustrating a side view of an MCM 100 with an optical interposer 120. This MCM includes a substrate 110-1 (such as a semiconductor die or chip) having a surface 112-1 and a substrate 110-2 having a surface 112-2 (which faces surface 112-1). Substrate 110-1 may include: an optical waveguide 114-1 disposed on surface 112-1 (for example, as described below with reference to FIG. 2, optical waveguide 114-1 may be implemented using silicon-on-insulator technology); and an optical coupler 116-1 (which may be an optical proximity coupler or OP×C) optically coupled to optical waveguide 114-1.

Moreover, substrate 110-2 may include: an optical waveguide 114-2 disposed on surface 112-2; and an optical coupler 116-2 optically coupled to optical waveguide 114-2. Note that optical couplers 116 may have etched reflecting facets 118 (such as a trench in a given substrate that is coated with a metal, e.g., aluminum or gold). Furthermore, optical interposer 120 may be positioned between surfaces 112.

During operation, optical waveguides 114 may convey an optical signal, and optical couplers 116 may couple the optical signal between a direction 122 in the plane of optical waveguides 114 and a direction 124 out of the plane of optical waveguides 114. Optical interposer 120 may guide the optical signal between optical couplers 116, thereby reducing spatial expansion or optical divergence of the optical signal between optical couplers 116. Thus, optical interposer 120 may reduce optical losses when coupling the optical signal between substrates 110.

As shown in FIG. 1, optical interposer 120 may include an optical channel 126 (or light pipe) surrounded by an interposer substrate 128 to transport the optical signal. This optical channel may be aligned with optical couplers 116 so that the optical signal is directly coupled between substrates 110 and the light captured by optical channel 126 is maximized. Note that optical channel 126 may preserve an optical mode of the optical signal, which is associated with optical waveguides 114 and/or optical couplers 116. In an exemplary embodiment, optical interposer 120 has a thickness between 100-250 μm.

In some embodiments, the optical mode of optical couplers 116 is different than the optical mode of optical waveguides 114. For example, optical waveguides 114 may include inverse tapers 134 that gradually expand cross-sectional areas of optical waveguide 114 proximate to optical couplers 116, thereby adiabatically changing the spatial extent of the optical mode of the optical signal. For example, tapers 134 may be up to 12 μm in height and may have a horizontal extent of up to 20 μm. (While FIG. 1 illustrates tapers 134 along direction 124, in general tapers 134 may be along directions 122 and/or 124.) Alternatively, instead of tapers 134, the thickness of optical waveguides 114 may be increased in proximity to optical couplers 116 to change the optical mode of the optical signal. For example, the thickness may be increased from a thickness of 0.25-3 μm in the transport portion of optical waveguides 114 to a thickness of 2-12 μm proximate to optical couplers 116.

Furthermore, in some embodiments, each of substrates 110 includes a 2-dimensional array of optical waveguides and associated optical couplers on surfaces 112. In these embodiments, optical interposer 120 includes multiple optical channels (such as optical channel 126) that are aligned with the optical couplers on surfaces 112.

Because the coupling efficiency of silicon-photonic OP×Cs depends greatly on the accuracy and repeatability of the layer-to-layer alignment, a variety of techniques may be used to facilitate correct assembly of MCM 100 and to maintain alignment of the components. For example, the substrate 110-1 may include negative features 130-1 and 130-2 recessed below surface 112-1, and substrate 110-2 may include negative features 130-3 and 130-4 recessed below surface 112-2. MCM 100 may also include alignment features 132 aligned with and mechanically coupled to pairs of negative features 130, thereby facilitating alignment and maintaining relative positions of optical couplers 116. (For example, negative features 130-1 and 130-3 and alignment feature 132-1 may constitute a self-alignment mechanism that remateably or permanently aligns substrates 110.)

In some embodiments, the need for high-precision chip-to-chip alignment during assembly of MCM 100 may be relaxed because of the optical imaging that is possible through transparent optical channel 126. In particular, this optical imaging may be used to provide a visual reference to alignment fiducials (such as the facet in another optical coupler) and, thus, can be used to facilitate precise locking of the components in MCM 100 either using a flip-chip configuration, or by using a passively aligned ball-in-pit approach. This alignment technique can be used to reduce the lateral misalignment in MCM 100 to submicron values (i.e., nearly zero). In addition, the alignment technique may be used to control the spacing and, thus, the z-misalignment between substrates 110 along direction 124.

Note that negative features 130 may include etch pits. Additionally, alignment features 132 may include spherical balls. However, a number of techniques and configurations may be used to implement mechanical alignment of components in MCM 100. In particular, alignment and assembly of the substrates 110 in MCM 100 may be facilitated by positive and/or negative features that may be separated from or included on substrates 110. In general, positive features (which protrude or extend above a surrounding region on a surface) that are included on substrates 110 may be photolithographically defined using an additive (i.e., a material-deposition) and/or a subtractive (i.e., a material-removal) process. These positive features may include: hemispheres, bumps or top-hat shapes, ridges, pyramids, and/or truncated pyramids. Moreover, positive features on a given substrate may mate with or couple to negative features (which are positioned below or recessed relative to a surrounding region on a surface) on another substrate. Note that the negative features may also be photolithographically defined using an additive (i.e., a material-deposition) and/or a subtractive (i.e., a material-removal) process. Furthermore, in some embodiments positive and/or negative features on substrates 110 (such as an etch pit or slot) may be used in combination with micro-spheres or balls. This alignment technique can be implemented in a wafer-scale process, thereby facilitating simpler and lower-cost assembly of MCM 100.

In general, optical channel 126 in optical interposer 120 may include a core and a cladding layer, which guides the optical signal from one chip to the other. As is the case with optical fibers, the index of refraction of the core and the cladding may be selected to achieve this property. Note that optical interposer 120 may have an anti-reflective coating on the top and bottom surfaces.

As noted previously, optical interposer 120 may preserve the single or quasi-single optical mode associated with optical waveguides 114. This may impose an upper bound on a diameter of optical channel 126. For example, after reflecting from a mirror or facet, the optical-mode field emanating from an optical waveguide with a taper of 3 µm may be around 10 µm. As a consequence, the diameter of optical channel 126 may be approximately 10 µm to preserve the single or quasi-single optical mode.

Because of diffraction, during coupling between existing OP×Cs the optical beam continues to expand and this causes beam clipping at the other OP×C coupler, which contributes to high insertion loss. By adding optical interposer 120 to MCM 100, the expansion of the light beam can be arrested and the same beam waist can be transferred from the bottom to the top surface of optical interposer 120. This configuration may minimize beam diffraction and, thus, the clipping losses.

A variety of approaches may be used to fabricate optical interposer 120. In an exemplary embodiment, interposer substrate 128 includes silicon and optical channel 126 includes a through-silicon optical via. For example, the through-silicon optical via may include epoxy. This embodiment may be fabricated by dry or wet etching one or more holes (up to 10 µm in diameter) in the silicon substrate. Then, a given hole may be filled with a first optical material for the cladding (i.e., an annulus) closest to the outer diameter of the given hole, and then may be filled with a second optical material for the core of optical channel 126. Moreover, chemical mechanical polishing on one surface of optical interposer 120 and back grinding on the other surface may be used to achieve a thickness between 100 and 250 µm. Next, both surfaces may be coated with an anti-reflection coating and one or more optical interposers may be singulated from a wafer.

Alternatively, interposer substrate 128 may include a glass and optical channel 126 may include a through-glass optical via. For example, the through-glass optical via may include a material having an index of refraction larger than the glass, such as titanium oxide, silicon nitride and/or titanium nitride. In this embodiment, the outer glass may provide the cladding layer, and through-glass optical vias may be laser drilled or chemically etched and filled with a core material having a larger index of refraction than the cladding. Then, optical interposer 120 can be polished to the desired thickness and coated with an anti-reflective material on both surfaces.

In some embodiments, optical interposer 120 includes bundles of optical fibers and optical channel 126 includes at least one of the bundles. For example, the bundles of fibers may be extruded to precise dimensions and fused together into a rectangular strip. In this strip, the 3-10 µm diameter fiber cores may be placed at precisely defined locations to form the array and the cladding may be spread all around. As part of the extrusion process, the fiber bundle may be pulled and shaped into a rectangular bar. Then, this bar may be diced into 100-250 µm thick slices, polished on both surfaces and coated with an anti-reflective material.

Additionally, in some embodiments optical channel 126 transports the optical signal within optical interposer 120 using total internal reflection. For example, optical channel 126 may include silicon and interposer substrate 128 may include a dielectric, such as silicon dioxide.

Figure 2:
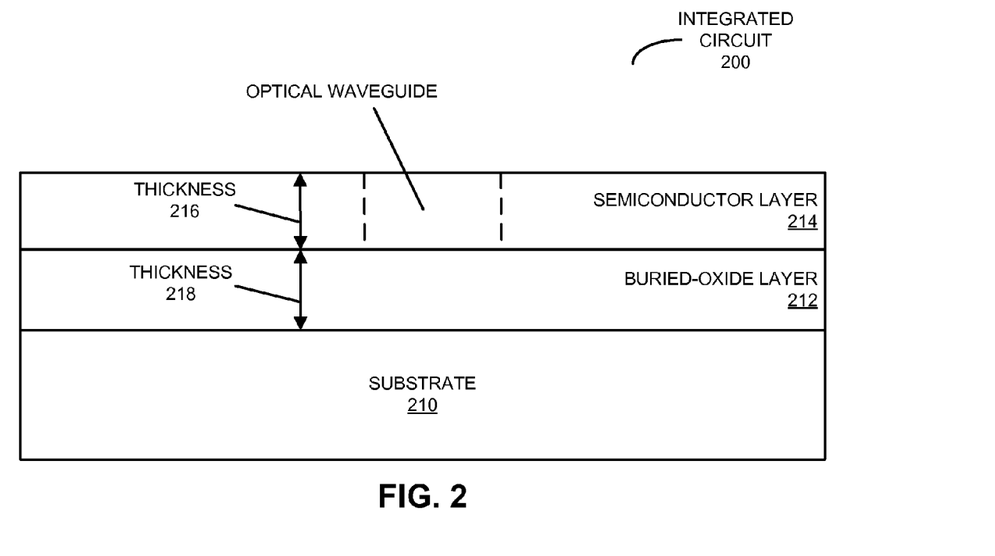
FIG. 2 is a block diagram illustrating a side view of an integrated circuit in accordance with an embodiment of the present disclosure.

As shown in FIG. 2, which presents a block diagram illustrating a side view of an integrated circuit 200, embodiments of the MCM may be implemented using silicon-on-insulator (SOI) technology. As a consequence, a substrate 210, which can be substrate 110-1 or substrate 110-2 (FIG. 1), may include: a buried-oxide layer 212 disposed on substrate 210; and a semiconductor layer 214 disposed on buried-oxide layer 212. Note that a given optical waveguide, which can be optical waveguide 114-1 or optical waveguide 114-2 (FIG. 1), may be defined in semiconductor layer 214. Moreover, substrate 210 may include a semiconductor, such as silicon.

In an exemplary embodiment, semiconductor layer 214 may have a thickness 216 that is less than 1 µm (such as 0.2-0.3 µm). Furthermore, buried-oxide layer 212 may have a thickness 218 between 0.3 and 3 µm (such as 0.8 µm).

Figure 3:
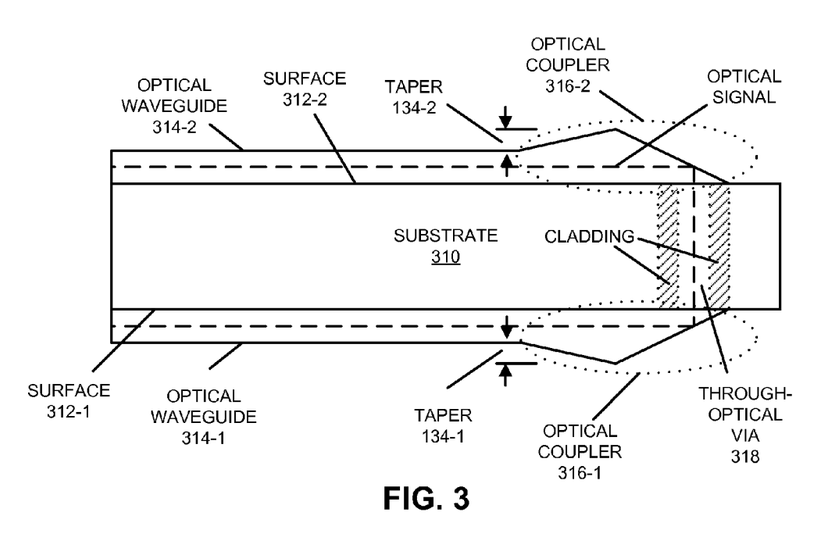
FIG. 3 is a block diagram illustrating a side view of a substrate with a through-optical via in accordance with an embodiment of the present disclosure.

In another embodiment, a through-optical via may be fabricated on a silicon-on-insulator or a silicon substrate. As shown in FIG. 3, which presents a block diagram illustrating a side view of a substrate 310, through-optical via 318 may include a silicon core surrounded by silicon-dioxide cladding. For example, this structure may be fabricated by etching an annulus partially through substrate 310, filling it with silicon dioxide, and then etching through the remainder of the substrate thickness. In this embodiment, an optical signal in optical waveguide 314-1 on surface 312-1 may be coupled by optical coupler 316-1 into through-optical via 318 (which functions as a light pipe) to a matching optical coupler 316-2 and optical waveguide 314-2 on surface 312-2 of substrate 310.

Note that optical coupler 316-1 may expand the optical mode of the optical signal in optical waveguide 314-1 to a reflecting facet using total internal reflection, which then couples the optical signal into through-optical via 318. The light may traverse the interior of substrate 310 to reach surface 312-2 using the guiding properties of through-optical via 318.

In an exemplary embodiment, the diameter of through-optical via 318 is on the order of the optical wavelength. Moreover, the cladding may need to be thick enough to prevent radiation from leaking into substrate 310. In addition, by stacking die together, a vertical 3-dimensional stack of through-optical vias can distribute optical signals into any of the intermediate wafers in the wafer stack.

Figure 4:
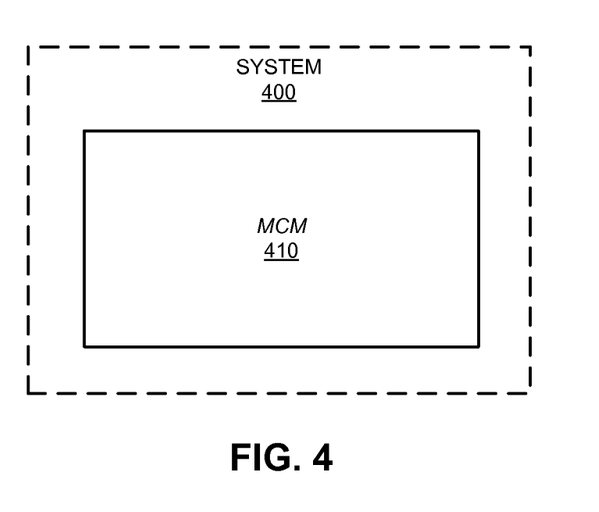
FIG. 4 is a block diagram illustrating a system that includes an MCM in accordance with an embodiment of the present disclosure.

We now describe embodiments of the system. FIG. 4 presents a block diagram illustrating a system 400 that includes an MCM 410, such as MCM 100 (FIG. 1). System 400 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. Note that a given computer system may be at one location or may be distributed over multiple, geographically dispersed locations.

MCM 100 (FIG. 1), integrated circuit 200 (FIG. 2), substrate 310 (FIG. 3) and system 400 may include fewer components or additional components. For example, two or more optical interposers, with aligned optical channels, may be stacked on top of one another. Moreover, the substrates may include: a semiconductor die (such as silicon), a ceramic, an organic material and/or glass. Furthermore, in some embodiments alignment of components in the MCM is facilitated using spring clamps, which may be fabricated on the surfaces of the substrates.

Although the MCMs and the system are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. In addition, functionality in the preceding embodiments may be implemented more in hardware and less in software, or less in hardware and more in software, as is known in the art.

Figure 5:
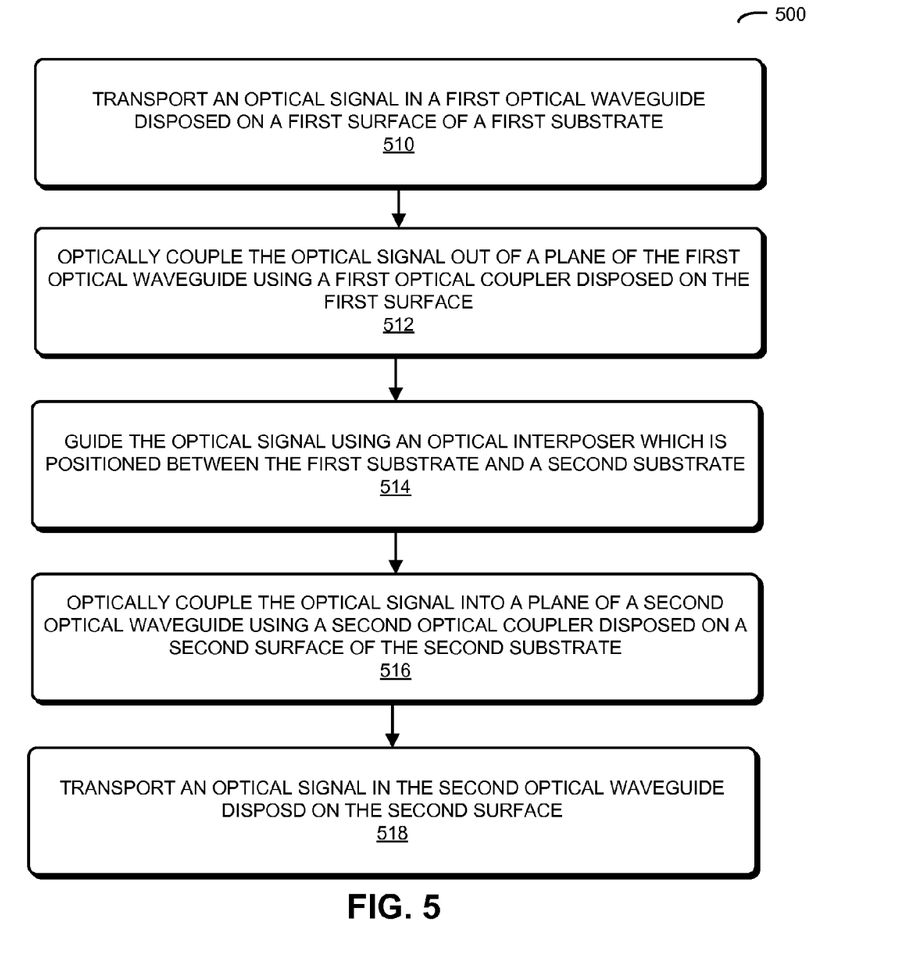
FIG. 5 is a flow diagram illustrating a method for directly optically coupling an optical signal from a first substrate to a second substrate in an MCM in accordance with an embodiment of the present disclosure.

We now discuss embodiments of the method. FIG. 5 presents a flow diagram illustrating a method 500 for directly optically coupling an optical signal from a first substrate to a second substrate in MCM 100 (FIG. 1). During this method, the optical signal is transported in a first optical waveguide disposed on a first surface of the first substrate (operation 510). Then, the optical signal is optically coupled out of a plane of the first optical waveguide using a first optical coupler disposed on the first surface (operation 512). Moreover, the optical signal is guided using an optical interposer which is positioned between the first substrate and the second substrate (operation 514), thereby reducing spatial expansion of the optical signal. Furthermore, the optical signal is optically coupled into a plane of a second optical waveguide using a second optical coupler disposed on a second surface of the second substrate (operation 516). Next, the optical signal is transported in the second optical waveguide disposed on the second surface (operation 518).

In some embodiments of method 500 there may be additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A multi-chip module (MCM), comprising:
   a first substrate having a first surface, wherein the first substrate includes:
      a first optical waveguide disposed on the first surface; and
      a first optical coupler optically coupled to the first optical waveguide, wherein the first optical coupler is configured to couple an optical signal between a plane of the first optical waveguide and a direction out of the plane of the first optical waveguide;
   a second substrate having a second surface facing the first surface of the first substrate, wherein the second substrate includes:
      a second optical waveguide disposed on the second surface; and
      a second optical coupler optically coupled to the second optical waveguide, wherein the second optical coupler is configured to couple the optical signal between a plane of the second optical waveguide and a direction out of the plane of the second optical waveguide; and
   an optical interposer, positioned between the first surface and the second surface, configured to guide the optical signal between the first optical coupler and the second optical coupler, thereby reducing spatial expansion of the optical signal between the first optical coupler and the second optical coupler.

2. The MCM of claim 1, wherein the optical interposer includes an optical channel surrounded by an interposer substrate to transport the optical signal; and wherein the optical channel is aligned with the first optical coupler and the second optical coupler.

3. The MCM of claim 2, wherein the optical channel preserves an optical mode of the optical signal.

4. The MCM of claim 2, wherein the interposer substrate includes silicon and the optical channel includes a through-silicon optical via.

5. The MCM of claim 4, wherein the through-silicon optical via includes epoxy.

6. The MCM of claim 2, wherein the interposer substrate includes a glass and the optical channel includes a through-glass optical via.

7. The MCM of claim 6, wherein the through-glass optical via includes a material having an index of refraction larger than the glass.

8. The MCM of claim 7, wherein the material includes one of: titanium oxide, silicon nitride and titanium nitride.

9. The MCM of claim 2, wherein the optical interposer includes bundles of optical fibers and the optical channel includes at least one of the bundles.

10. The MCM of claim 2, wherein the optical channel is configured to transport the optical signal within the optical interposer using total internal reflection.

11. The MCM of claim 10, wherein the optical channel includes silicon and the interposer substrate includes a dielectric.

12. The MCM of claim 11, wherein the dielectric includes silicon dioxide.

13. The MCM of claim 1, wherein a given optical coupler, which can be one of the first optical coupler and the second optical coupler, includes a reflecting facet.

14. The MCM of claim 1, wherein the first substrate includes first negative features recessed below the first surface;

wherein the second substrate includes second negative features recessed below the second surface; and wherein the MCM further includes alignment features aligned with and mechanically coupled to the pairs of the first negative features and the second negative features, thereby facilitating alignment and maintaining relative positions of the first optical coupler and the second optical coupler.

15. The MCM of claim 14, wherein the first negative features and the second negative features include etch pits.

16. The MCM of claim 14, wherein the alignment features include spherical balls.

17. The MCM of claim 1, wherein a given substrate, which is one of the first substrate and the second substrate, includes:

a buried-oxide layer disposed on the given substrate; and a semiconductor layer disposed on the buried-oxide layer, wherein a given optical waveguide, which is one of the first optical waveguide and the second optical waveguide, is defined in the semiconductor layer.

18. The MCM of claim 1, wherein a given substrate, which is one of the first substrate and the second substrate, includes a semiconductor.

19. A system, comprising an MCM, wherein the MCM includes:

a first substrate having a first surface, wherein the first substrate includes:

a first optical waveguide disposed on the first surface; and a first optical coupler optically coupled to the first optical waveguide, wherein the first optical coupler is configured to couple an optical signal between a plane of the first optical waveguide and a direction out of the plane of the first optical waveguide;

a second substrate having a second surface facing the first surface of the first substrate, wherein the second substrate includes:

a second optical waveguide disposed on the second surface; and a second optical coupler optically coupled to the second optical waveguide, wherein the second optical coupler is configured to couple the optical signal between a plane of the second optical waveguide and a direction out of the plane of the second optical waveguide;

an optical interposer, positioned between the first surface and the second surface, configured to guide the optical signal between the first optical coupler and the second optical coupler, thereby reducing spatial expansion of the optical signal between the first optical coupler and the second optical coupler;

a processor incorporated into one of the first substrate and the second substrate; and a memory incorporated into one of the first substrate and the second substrate.

20. A method for directly optically coupling an optical signal from a first substrate to a second substrate, the method comprising:

transporting the optical signal in a first optical waveguide disposed on a first surface of the first substrate;

optically coupling the optical signal out of a plane of the first optical waveguide using a first optical coupler disposed on the first surface;

guiding the optical signal using an optical interposer which is positioned between the first substrate and the second substrate, thereby reducing spatial expansion of the optical signal;

optically coupling the optical signal into a plane of a second optical waveguide using a second optical coupler disposed on a second surface of the second substrate; and transporting the optical signal in the second optical waveguide disposed on the second surface.

* * * * *